United States Patent [19]

Campbell, Jr.

[11] Patent Number: 4,468,160
[45] Date of Patent: Aug. 28, 1984

[54] WOODWORKING MACHINE

[75] Inventor: Robert L. Campbell, Jr., Hickory

[73] Assignee: Campbell Automation, Incorporated, Hickory, N.C.

[21] Appl. No.: 416,155

[22] Filed: Sep. 9, 1982

[51] Int. Cl.³ ............................................. B23C 1/06
[52] U.S. Cl. .............................. 409/202; 83/925 CC; 144/134 A; 144/136 R; 409/99
[58] Field of Search ............ 409/202, 99; 144/136 R, 144/134 R, 134 A, 137; 83/658, 659, 747, 925 CC

[56] References Cited

U.S. PATENT DOCUMENTS

| | | | |
|---|---|---|---|
| 2,827,836 | 3/1958 | Horth et al. | 409/202 |
| 3,296,932 | 1/1967 | Pankonin et al. | 409/202 |
| 3,452,791 | 7/1969 | Roberts, Jr. | 83/367 |
| 3,650,178 | 3/1972 | Appleton | 409/99 |
| 4,204,448 | 5/1980 | Pearl | 83/925 CC |

Primary Examiner—W. D. Bray
Attorney, Agent, or Firm—Bell, Seltzer, Park & Gibson

[57] ABSTRACT

The workpiece supporting bed of the present machine is provided with a ballast filled frame structure therebelow for forming a solid unitary support structure to dampen operational vibrations normally transmitted to the bed. A gantry extends above and across the workpiece supporting bed and includes a cast main beam formed of lightweight material to facilitate rapid movement, particularly rapid acceleration and deceleration during forward and rearward movement of the gantry. Integrally cast longitudinally and laterally extending ribs are provided on the main beam to provide additional stiffness and rigidity thereto. A single drive motor is provided to drive opposed sides of the gantry simultaneously and in accurate alignment with each other. A rearwardly extending housing is attached to the main frame and is filled with a lightweight plastic material for adding further rigidity and stiffness to the gantry, without substantially increasing the weight thereof.

12 Claims, 7 Drawing Figures

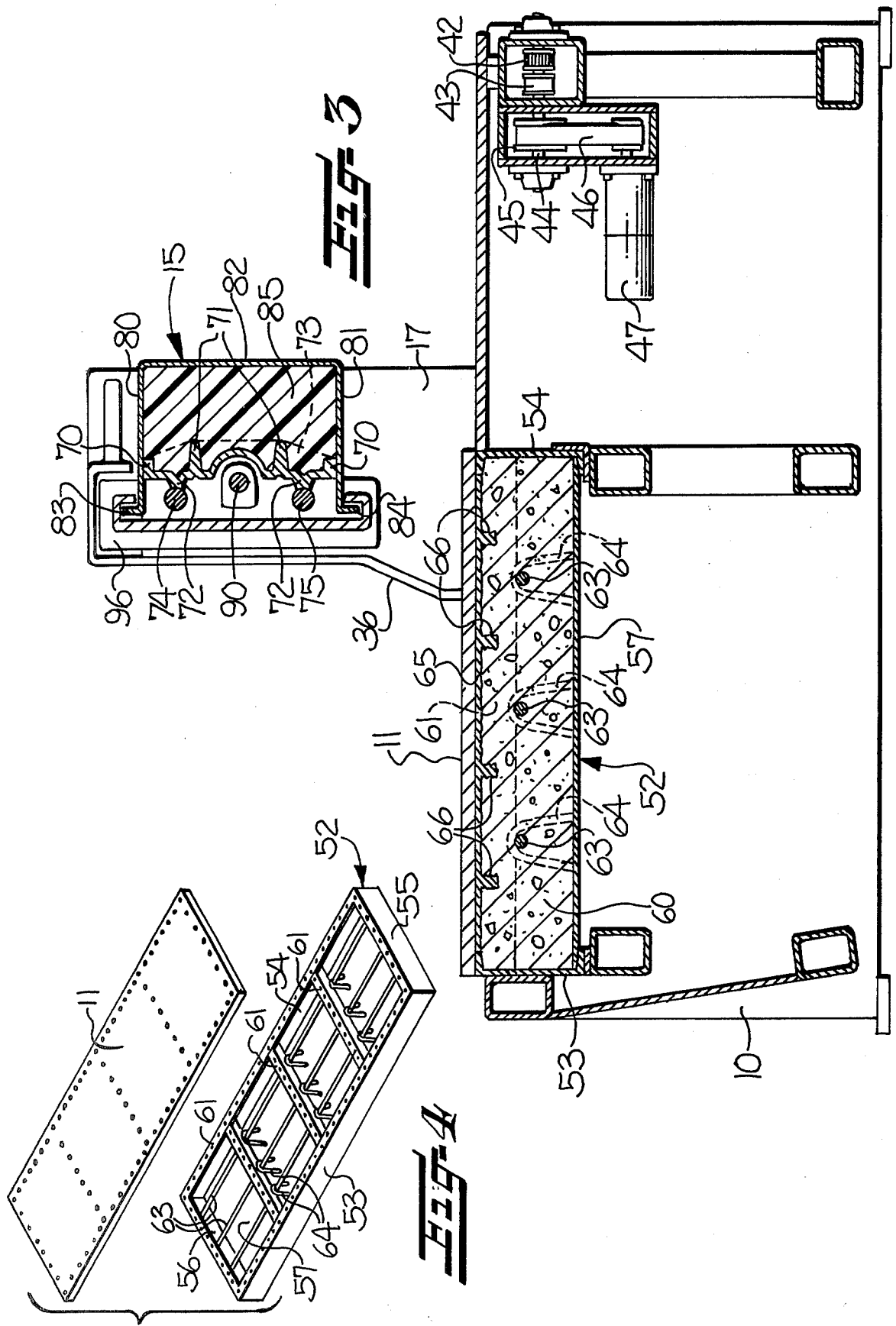

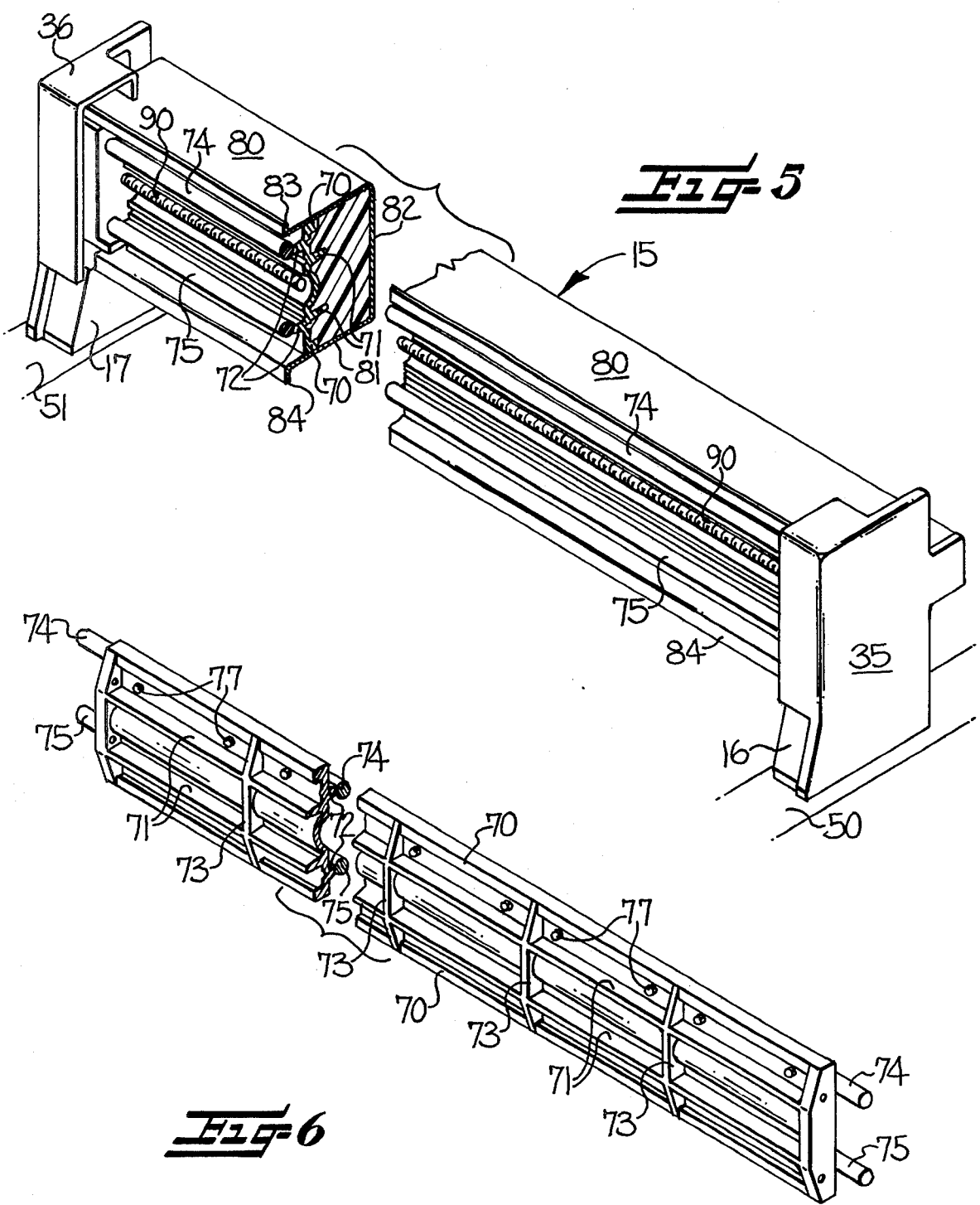

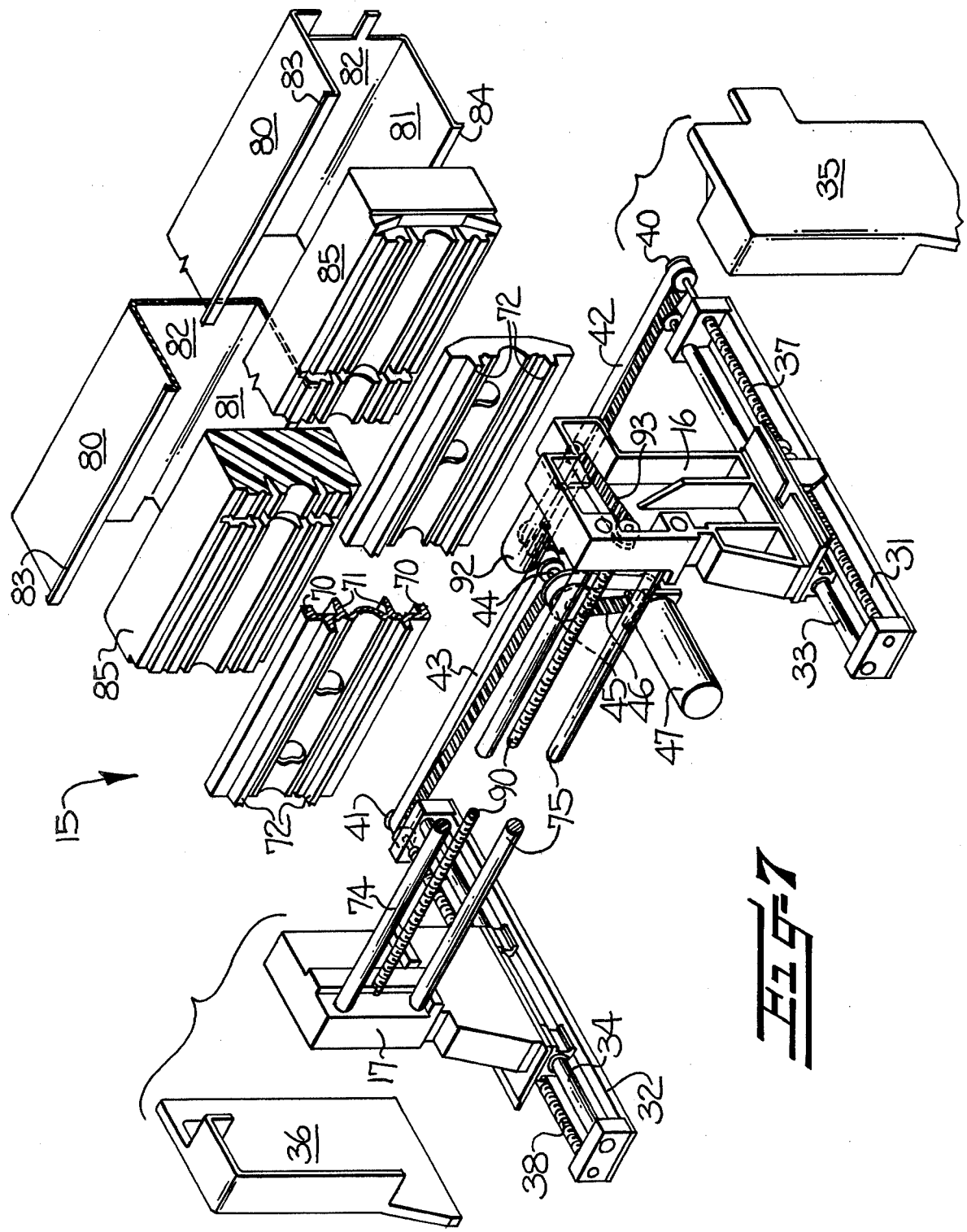

WOODWORKING MACHINE

FIELD OF THE INVENTION

This invention relates generally to a woodworking machine and more particularly to a router/shaper woodworking machine of the type including a lightweight gantry capable of being moved at very rapid rates of speed in forward and rearward directions above a fixed workpiece supporting bed.

BACKGROUND OF THE INVENTION

It is known to provide a movable gantry in a metalworking machine, such as a milling machine, in which the bed of the machine is stationary and the movable gantry is formed of heavy and massive steel construction to support one or more cutting heads mounted for longitudinal movement thereon. The cutting heads are also mounted on the gantry for vertical movement and the three-axis operation of the cutter is automatically controlled by a numerical control system for computerized commands stored on a magnetic tape or the like.

In this type of metal working machine, the accuracy of the movement and/or positioning of the cutter is largely dependent upon the nonflexibility, stiffness or rigidity of the gantry and the workpiece supporting bed. The accuracy of the movement and positioning of the cutter is also dependent upon the accuracy with which the cutter is guided in its three-axis movements relative to the workpiece supporting bed. The massive size and weight of the gantry do provide the desired amount of rigidity but also limits the speed forward and rearward movement of the gantry when moving from one operating position to another, as well as the speed of movement during the actual cutting operation. With such a heavy and massive gantry, the time and distance required to accelerate from a stationary position to the desired speed, as well as the time and distance required to decelerate, requires that the machine be operated at a slower speed than is desirable.

The massive gantry also aids in preventing operational vibrations which, if permitted, cause the cutting tool to chatter and vibrate so that a smooth cut is not formed. The workpiece supporting bed is also usually formed of a massive block of solid steel to prevent operational vibrations in the workpiece supporting bed and the workpiece supported thereby. The heavy steel construction of the gantry and the workpiece supporting bed causes the machine to be very heavy and increases the cost of producing the machine.

Because of the massive size and relatively slow operational speeds of the known types of movable gantry metalworking machines, this type of machine is not economically suitable for and has not been adapted for use as a router/shaper woodworking machine for cutting furniture pieces and the like.

SUMMARY OF THE INVENTION

With the foregoing in mind, it is an object of the present invention to provide a router/shaper woodworking machine including a lightweight movable gantry for facilitating rapid movement, particularly rapid acceleration and deceleration during forward and rearward movement of the gantry. The lightweight gantry also has sufficient stiffness and rigidity to ensure the accuracy of the movement and/or positioning of the cutting tool. The woodworking machine of the present invention is also provided with a fixed workpiece supporting bed having a ballast filled frame structure attached to the lower surface and forming a solid unitary support structure for dampening operational vibrations normally transmitted to the workpiece supported thereon. The rigidity of the gantry and the solid unitary support provided for the workpiece supporting bed cooperate to reduce the possibility of chattering of the cutting tool and uneven cuts being made thereby.

In accordance with the present invention, the gantry includes a cast main beam formed of lightweight material to facilitate rapid movement, particularly rapid acceleration and deceleration during forward and rearward movement of the gantry. Integrally cast longitudinally and laterally extending ribs are provided on the main beam to provide stiffness and rigidity thereto. Machine ways are supported adjacent opposite sides of the main frame of the machine and extend forwardly and rearwardly along each side of the workpiece supporting bed. Drive screws extend parallel to the machine ways and are threadably engaged in the lower ends of upright side supports, to the upper ends of which the opposite ends of the gantry are connected. A single drive motor is utilized to drivingly connect the drive screws at opposite ends of the main frame so that the upright side supports are always moved together and by exactly equal amounts so that the gantry always remains in the same right-angular position above the workpiece supporting bed when it is being moved either forwardly or rearwardly thereof.

The gantry also includes a lightweight housing extending rearwardly from the main beam and a lightweight plastic material fills the space rearwardly of the main beam and within the housing to add further rigidity and stiffness to the gantry without substantially increasing the weight thereof.

BRIEF DESCRIPTION OF THE DRAWINGS

Other objects and advantages will appear as the description proceeds when taken in conjunction with the accompanying drawings, in which

FIG. 3 is an enlarged vertical sectional view taken substantially along the line 3—3 in FIG. 1;

FIG. 4 is an exploded isometric view of the workpiece supporting bed and the frame structure for supporting the same, before it is filled with ballast material;

FIG. 5 is a somewhat schematic isometric view of the gantry and the corresponding upright side supports and with a medial portion of the gantry being broken away to illustrate the construction thereof;

FIG. 6 is an isometric view of the opposite side of the main beam of the gantry shown in FIG. 5, with a medial portion broken away to illustrate the cross-sectional configuration thereof; and FIG. 7 is a somewhat schematic and exploded isometric view of the gantry and the upright side supports supporting the same for forward and rearward movement along opposite side portions of the machine.

DESCRIPTION OF THE ILLUSTRATED EMBODIMENT

Figure 1:
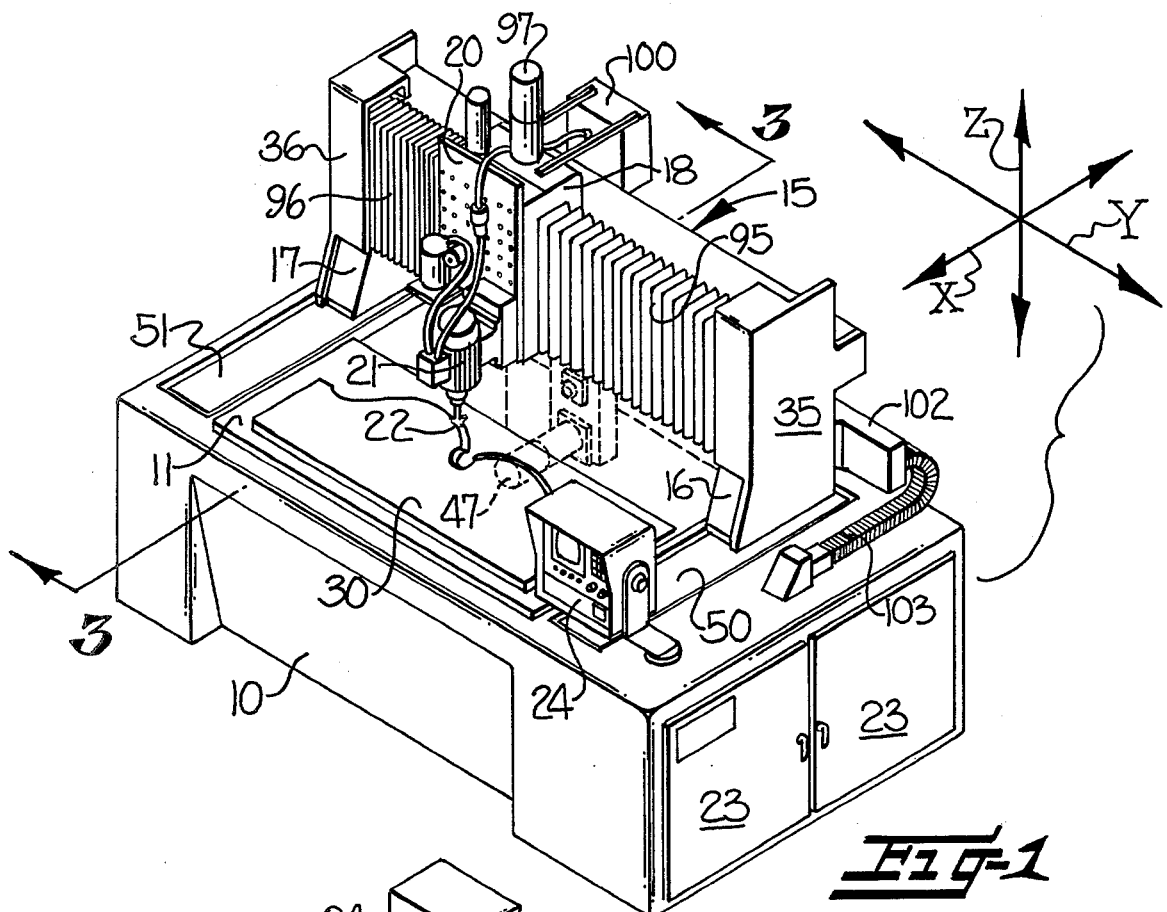
FIG. 1 is a front isometric view of the present woodworking machine.
Figure 2:
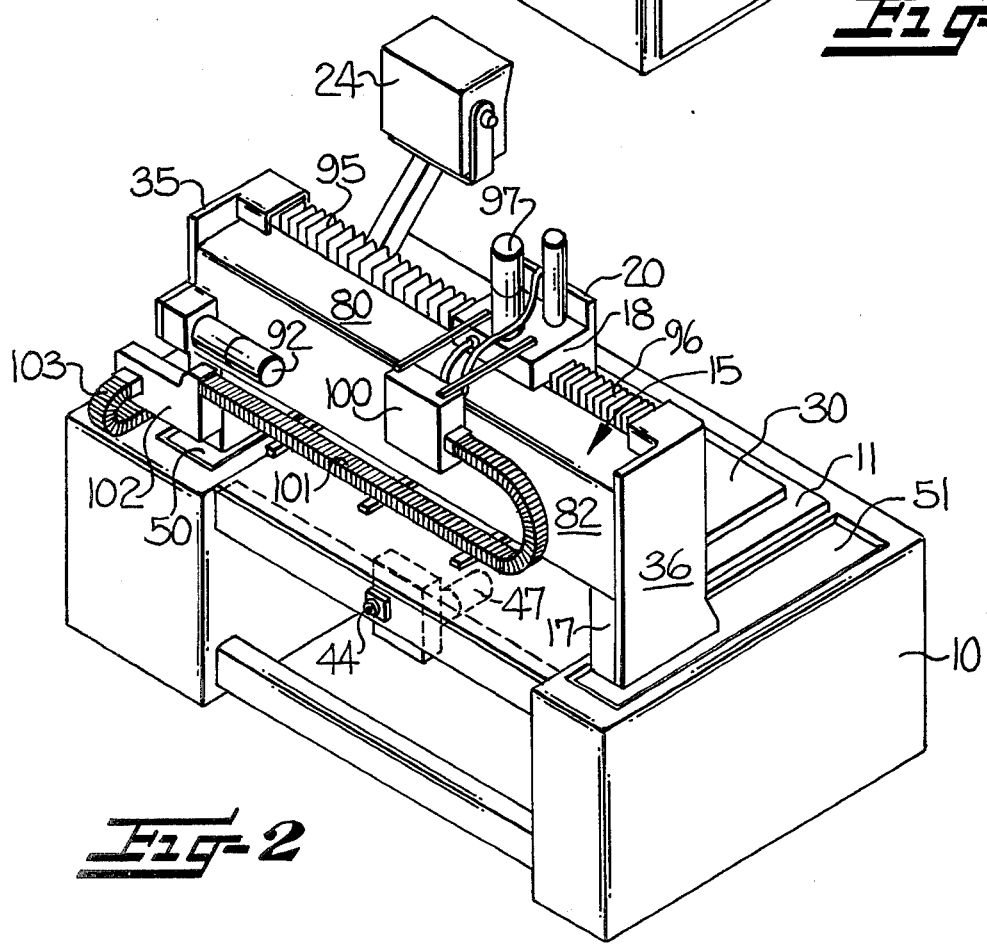
FIG. 2 is a rear isometric view of the woodworking machine.

As illustrated in FIGS. 1 and 2, the router/shaper woodworking machine of the present invention includes a rectangular built-up main frame 10 with a workpiece supporting bed 11 extending across the medial portion of the main frame 10. A gantry, broadly indicated at 15, is connected at opposite ends of the upper portions of upright side supports 16, 17 so that the gantry 15 may be moved forwardly and rearwardly of the main frame 10, in a manner to be presently described. A work station support housing 18 is mounted for longitudinal movement along the gantry 15 and from one side of the machine to the other, and a tool holder, in the form of a plate 20, is supported for vertical movement on the work station support housing 18. The tool holder 20 supports a drive motor 21 and a rotary cutter tool 22 is removably secured to the drive motor 21.

The various movements and motions of the cutter tool 22 are automatically controlled by a numerical control system from computerized commands or signals recorded or otherwise stored on magnetic tape or the like, not shown. The numerical control may be of a conventional type and is normally stored in one end of the machine frame 10 in a cabinet formed in the right-hand end of the main frame and closed by doors 23 (FIG. 1). A manual control panel and monitor 24 is mounted on the machine so that the operator may observe the operation and manually override or control the operations of the machine.

The various motions of the cutter tool 22 are moved along an orthogonal set of coordinate X, Y and Z axes, as indicated by the arrow lines adjacent the right-hand portion of FIG. 1. The gantry 15 is moved forwardly and rearwardly in a horizontal plane and along the X axis, the tool holder 20 is also moved in a horizontal plane and along the gantry 15 in a side-to-side movement along the Y axis, and the tool holder 20 is supported on the work station support housing 18 for vertical up and down movement along the Z axis.

While the gantry 15 will be described as formed in a single piece, it is to be understood that the width of the machine can be varied by providing a wider main frame 10 and forming the gantry as a single piece or of a plurality of connected segments. Also, it is to be understood that the lengthwise dimension from front to rear of the machine can also be varied to provide a longer working area along the X axis.

As shown in FIG. 1, a relatively wide workpiece 30, such as the headboard or footboard for a bed, may extend substantially the full width of the workpiece support bed 11. If desired, two separate work stations can be provided on the workbed 11, one for conducting a cutting operation while the other is being employed for setup of a second cutting operation. In this manner the two work stations can be alternately used with a single control and cutting unit, which arrangement may prove to be highly economical when the cutting time and setup time are taking place simultaneously. Also, it is to be understood that more than one work station support housing 18 may be provided on the gantry 15 so that simultaneous cutting operations may be performed.

As described above, the gantry 15 is mounted to straddle the workpiece support bed 11 and is driven forwardly and rearwardly by drive means which is drivingly connected to the upright side support 16, 17. As best shown in FIG. 7, the drive means for moving the gantry 15 forwardly and rearwardly includes first machine ways 31, 32 supported on opposite sides of the main frame and extending forwardly and rearwardly thereof. The machine ways 31, 32 are each cast with an integrally formed upstanding rib on which is supported respective guide rods 33, 34 for guidingly receiving and supporting the bearings on the lower portions of upright side supports 16, 17 which are covered by respective upright side support covers 35, 36. Respective drive screws 37, 38 are rotatably supported in the corresponding machine ways 31, 32 and extend parallel to the respective guide rods 33, 34. The drive screws 37, 38 are threadably engageable with threaded bosses on the lower portions of the respective side supports 16, 17. Thus, with rotation of the drive screws 37, 38, forward and rearward motion is imparted to the side supports 16, 17, and the gantry 15 connected thereto.

The rear ends of the drive screws 37, 38 are provided with respective drive pulleys 40, 41 which are engaged by respective timing belts 42, 43. The timing belts 42, 43 extend inwardly and are engaged by corresponding drive pulleys supported on a jack shaft 44. The forward end of the jack shaft 44 is provided with a drive pulley 45 which is engaged by a timing belt 46 drivingly connected to a reversible drive motor 47. The reversible drive motor 47 is supported intermediate the opposite end of the main frame 10, as illustrated in FIG. 2, and its operation is controlled by the numerical control unit.

The single drive motor 47 and the timing belt connection with the respective drive screws 37, 38 ensure that the side supports 16, 17 are accurately moved the proper distance forwardly and rearwardly and are simultaneously moved along the X axis to prevent any skewing motion or torsional strain on the gantry 15. The first machine ways 31, 32 are supported by opposite end portions of the main frame 10 and respective dust plates or tracks 50, 51 (FIG. 1) are provided to prevent the entry of sawdust and the like into the machine ways 31, 32 with back and forth movement of the gantry 15.

A ballast filled frame structure, broadly indicated at 52 in FIGS. 3 and 4, is supported on the main frame 10 and extends below the workpiece supporting bed 11 to form a solid unitary and rigid support structure for dampening operational vibrations normally transmitted to the bed 11. The ballast filled frame structure 52 is rectangular and includes interconnected respective front and rear walls 53, 54 and opposite end walls 55, 56. A bottom plate 57 extends between the front and rear walls 53 and 54, and end walls 55, 56 and is suitably connected thereto, and ballast material, indicated at 60, substantially fills the inside of the frame 52.

Suitable crossbraces 61 (FIG. 4) are spaced apart and fixed at opposite ends on the inner and upper portions of the front and rear walls 53, 54. The lower portions of the crossbraces 61 are spaced above the bottom plate 57 to permit the ballast material 60 to be positioned below and adjacent the crossbraces 61. Spaced apart reinforcing rods 63 are fixed at opposite ends on the end walls 55, 56 and extend beneath and are fixed to the lower portions of the crossbraces 61. Substantially U-shaped inverted hanger brackets 64 are fixed at their lower ends to the bottom plate 57 and their upper ends extend over the reinforcing rods 63 and are fixed thereto to aid in further stabilizing the reinforcing rods 63.

The ballast material 60 in the frame structure 52 is preferably concrete and is poured into the frame 52, shown in FIG. 4, up to a level substantially flush with the upper sides of the front and rear walls 53, 54 and the end walls 55, 56. As is well known, concrete will normally settle to some degree after is is poured and would normally leave a space between the upper surface thereof and the lower surface of the workpiece supporting bed 11. In order to fill this space and to further provide dampening of any vibrations, a layer of adhesive mastic material, such as a suitable epoxy, is spread across the upper layer of the ballast material 60, as indicated at 65 in FIG. 3, and allowed to partially harden before the workpiece supporting bed 11 is screwed into position on the upper portions of the front and rear side walls 53, 54 and the end walls 55, 56. To aid in stabilizing the adhesive material to the upper surface of the ballast material 60, it is preferred that a series of holes or openings, indicated at 66 in FIG. 3, be provided in the upper surface of the ballast material 60 so that the adhesive material 65 will flow into the holes 66 and help secure the same in position on the upper surface of the ballast material 60.

The gantry 15 extends above and across the workpiece supporting bed 11 and opposite ends are connected to and movable with the upper ends of the side supports 16, 17. The gantry 15 includes a cast main beam 70 formed of lightweight material, such as aluminum, to facilitate rapid movement and rapid acceleration and deceleration during forward and rearward movement of the gantry 15. The lightweight main beam 70 includes integrally cast longitudinally extending upper and lower ribs 71 on the rear surface thereof (FIG. 6) and upper and lower integrally cast longitudinally extending ribs 72 on the front surface thereof (FIG. 7). Laterally extending ribs 73 are also integrally cast with the lightweight main beam 70 and are spaced apart across the length of the rear surface of the main beam 70.

The longitudinally and laterally extending ribs provide stiffness and rigidity to the lightweight main beam 70 while maintaining the lightweight construction. The upper and lower spaced apart longitudinally extending ribs 72, on the front surface of the main beam 70, also serve to add rigidity to the main beam and form a secure support for the second machine ways, illustrated in the form of respective upper and lower longitudinally extending guide rods 74, 75. The upper and lower guide rods 74, 75 are secured to the longitudinally extending ribs 72 by spaced apart bolts, indicated at 77 in FIG. 6. The upper and lower guide rods 74, 75, fixed to the ribs 72, also provide further stiffness and rigidity to the gantry 15.

The gantry 15 also includes a rearwardly extending housing including interconnected upper, lower and rear walls 80, 81 and 82 (FIGS. 3 and 7) with a longitudinally extending lip 83, 84 turned outwardly from the respective upper and lower walls 80, 81, for purposes to be presently described. The rearwardly extending housing extends throughout substantially the length of the main beam 70 with the rear wall 82 being spaced from the rear surface of the main beam 70 to provide an enclosed space rearwardly of the rear surface of the main beam 70.

The upper and lower walls 80, 81 are fixed to the corresponding upper and lower surfaces of the main beam 70 and extend forwardly thereof, as illustrated in FIGS. 3 and 5. The space within the housing and rearwardly of the rear surface of the main beam 70 is filled with a foam material which hardens to produce a lightweight plastic filler or block 85. As will be noted in FIG. 7, the forward surface of the lightweight plastic block 85 fills and conforms to the configuration of the rear surface of the lightweight metal main beam 70 and serves to add further rigidity and stiffness to the gantry 15, without substantially increasing the weight thereof.

The work station housing 18 is supported for horizontal side-to-side movement along the Y axis on the upper and lower guide rods 74, 75 and drive means is provided for moving the work station housing 18 along the second machine ways from one side to the other of the gantry 15. The drive means includes a drive screw 90 extending between the upper and lower guide rods 74, 75 and being rotatably supported at opposite ends in the side supports 16, 17 (FIG. 7). The end of the drive screw 90 supported in the side support 16 is provided with a drive pulley which is connected to the drive pulley of a reversible drive motor 92 by a timing belt 93. The drive screw 90 threadably penetrates the work station housing 18 and rotation of the drive screw moves the work station longitudinally along the gantry 15, depending upon the direction of rotation of the drive screw 90.

In order to protect the guide rods 74, 75 and the drive screw 90 from entry of dust, sawdust and the like, flexible bellows 95, 96 (FIGS. 1 and 2) are provided on opposite sides of the work station housing 18. The inner ends of the bellows 95, 96 are suitably connected to the work station housing 18 and the outer ends are suitably connected to the side supports 16, 17. As best shown in FIG. 3, the upper and lower medial portions of the bellows 95, 96 are supported for movement along the outwardly turned lips 83, 84 on the forward ends of the upper and lower walls 80, 81 of the rearwardly extending housing.

The tool holder 20, illustrated as a plate in FIGS. 1 and 2, is supported for vertical movement on third machine ways carried by the work station housing 18, not shown, and vertical movement is imparted to the tool holder 20 by a reversible electric motor 97 which is also controlled to impart vertical movement to the cutter tool 22 and drive motor 21 along the Z axis. An electrical outlet box 100 is supported on rearwardly extending arms from the work station housing 18 and a rectangular flexible electric wire containing connector housing 101 extends from the outlet box 100 to another outlet box 102 (FIG. 2) which is fixed on the side support 16. A second rectangular flexible connector housing 103 is connected to the outlet box 102 and extends into the control unit at one end of the machine (FIG. 1).

The lightweight and rigid gantry 15 permits a much faster forward and rearward movement than would be the case if the gantry were formed of heavy steel, such as is known in the prior art. The lightweight gantry 15 is about one-third as heavy as the heavy steel gantry of known milling machines of the same length. It has been found that the gantry of the present invention can be moved at a speed of 900 inches per minute when moving from one cutting location to another and can be moved at a speed of 600 inches per minute during cutting operations. This compares to operational speeds of between 100 and 200 inches per minute which may be obtained with a heavy steel gantry of the prior art type. Also, the movement of the cutting tool in the present machine may be accelerated from a standing position to the operational speed in a distance of about two inches and can be decelerated from an operational speed to a standstill position in substantially the same two-inch distance. On the other hand, the acceleration and deceleration distances normally required with a heavy steel gantry of the type used in a metalworking machine are about six times as great, that is, approximately twelve inches.

Thus, the lightweight and rigid gantry of the woodworking machine of the present invention has a much faster work speed than prior art types of machines. Further, the solid unitary support for the workpiece supporting bed dampens operational vibrations normally transmitted to the bed and the workpiece to thereby eliminate, or at least greatly reduce, any chattering of the cutting tool on the workpiece and to thereby provide smooth cuts in the workpiece.

In the drawings and specification there has been set forth the best mode presently contemplated for the practice of the present invention, and although specific terms are employed, they are used in a generic and descriptive sense only and not for purposes of limitation, the scope of the invention being defined in the claims.

That which is claimed is:

1. A woodworking machine including a main frame, a workpiece supporting bed extending across the medial portion of said main frame, a ballast filled frame structure supported on said main frame and extending below said workpiece supporting bed and forming a solid unitary support structure for dampening operational vibrations normally transmitted to said bed, first machine ways supported on said main frame and extending forwardly and rearwardly along each side of said bed, a pair of upright side supports positioned adjacent opposite sides of said bed, the lower ends of said upright side supports being supported for movement on said first machine ways, drive means for moving said side supports forwardly and rearwardly along said first machine ways, a gantry extending above and across said bed and including opposite ends connected to and movable with the upper ends of said side supports, said gantry including a cast main beam formed of lightweight material to facilitate rapid movement, particularly rapid acceleration and deceleration during forward and rearward movement of said gantry, said lightweight main beam including integrally cast ribs to provide stiffness and rigidity thereto, second machine ways connected to and extending longitudinally of said gantry, a vertically movable tool holder mounted for longitudinal movement along said second machine ways, and drive means for moving said tool holder along said second machine ways from one side to the other of said gantry.

2. A woodworking machine including a main frame, a workpiece supporting bed extending across the medial portion of said main frame, a ballast filled frame structure supported on said main frame and extending below said workpiece supporting bed and forming a solid unitary support structure for dampening operational vibrations normally transmitted to said bed, first machine ways supported on said main frame and extending forwardly and rearwardly along each side of said bed, a pair of upright side supports positioned adjacent opposite sides of said bed, the lower ends of said upright side supports being supported for movement on said first machine ways, drive means for moving said side supports forwardly and rearwardly along said first machine ways, said drive means comprising a respective drive screw extending parallel to each of said first machine ways and threadably engaging the lower ends of said side supports, and means drivingly connecting said drive screws and including only a single drive motor, a gantry extending above and across said bed and including opposite ends connected to and movable with the upper ends of said side supports, said gantry including a cast main beam formed of lightweight material to facilitate rapid movement, particularly rapid acceleration and deceleration during forward and rearward movement of said gantry, said lightweight main beam including integrally cast longitudinally and laterally extending ribs to provide stiffness and rigidity thereto, second machine ways connected to and extending longitudinally of said gantry, a vertically movable tool holder mounted for longitudinal movement along said second machine ways, and drive means for moving said tool holder along said second machine ways from one side to the other of said gantry.

3. A woodworking machine including a main frame, a workpiece supporting bed extending across the medial portion of said main frame, a frame structure supported on said main frame and extending below said workpiece supporting bed, concrete ballast material filling said frame structure and forming a solid unitary support structure for dampening operational vibrations normally transmitted to said bed, first machine ways supported on said main frame and extending forwardly and rearwardly along each side of said bed, a pair of upright side supports positioned adjacent opposite sides of said bed and supported for forward and rearward movement, drive means for moving said side supports forwardly and rearwardly along said first machine ways, a gantry extending above and across said bed and including opposite ends connected to and movable with the upper ends of said side supports, second machine ways connected to and extending longitudinally of said gantry, a vertically movable tool holder mounted for longitudinal movement along said second machine ways, and drive means for moving said tool holder along said second machine ways from one side to the other of said gantry.

4. A woodworking machine according to claim 3 wherein said ballast filled frame structure is rectangular and includes interconnected front and rear walls, and opposite end walls, and a bottom extending between said front, rear and end walls.

5. A woodworking machine according to claim 4 wherein said workpiece supporting bed is fixed on and extends between said front, rear and end walls of said frame, and wherein a layer of adhesive material is positioned on and extends across the upper surface of the concrete and fills the space between the upper surface of the concrete and the lower surface of said workpiece supporting bed.

6. A woodworking machine according to claims 4 or 5 including spaced apart crossbraces fixed at opposite ends on the upper portions of said front and rear walls, the lower portions of said crossbraces being spaced above said bottom to permit the concrete to be positioned below said crossbraces, and spaced apart reinforcing rods fixed at opposite ends on said end walls and extending beneath and being fixed to the lower portions of said crossbraces.

7. A woodworking machine including a main frame, a workpiece supporting bed extending across the medial portion of said main frame, first machine ways supported on said main frame and extending forwardly and rearwardly along each side of said bed, a pair of upright side supports positioned adjacent opposite sides of said bed, the lower ends of said upright side supports being supported for movement on said first machine ways, drive means for moving said side suports forwardly and rearwardly along said first machine ways, said drive means comprising a respective drive screw extending parallel to each of said first machine ways and threadably engaging the lower ends of said side supports, a drive motor supported on said main frame and between said drive screws, and flexible connector means drivingly connecting said drive screws and said drive motor, a gantry extending above and across said bed and including opposite ends connected to and movable with the upper ends of said side supports, second machine ways connected to and extending longitudinally of said gantry, a vertically movable tool holder mounted for longitudinal movement along said second machine ways, and drive means for moving said tool holder along said second machine ways from one side to the other of said gantry.

8. A woodworking machine according to claim 7 wherein said flexible connector means comprises a pair of timing belts drivingly connected to said drive motor and to the respective drive screws.

9. A woodworking machine including a main frame, a workpiece supporting bed extending across the medial portion of said main frame, first machine ways supported on said main frame and extending forwardly and rearwardly along each side of said bed, a pair of upright side supports positioned adjacent opposite sides of said bed, the lower ends of said upright side supports being supported for movement on said first machine ways, drive means for moving said side suports forwardly and rearwardly along said first machine ways, a gantry extending above and across said bed and including opposite ends connected to and movable with the upper ends of said side supports, said gantry including a cast main beam formed of lightweight material to facilitate rapid movement, particularly rapid acceleration and deceleration during forward and rearward movement of said gantry, said lightweight main beam including integrally cast longitudinally and laterally extending ribs to provide stiffness and rigidity thereto, second machine ways connected to and extending longitudinally of said gantry, a vertically movable tool holder mounted for longitudinal movement along said second machine ways, and drive means for moving said tool holder along said second machine ways from one side to the other of said gantry.

10. A woodworking machine according to claim 9 wherein said longitudinally and laterally extending ribs are formed on the rear surface of said main beam, wherein upper and lower spaced apart longitudinally extending ribs are integrally cast with the front surface of said main beam, and wherein said second machine ways comprise upper and lower spaced apart guide rods extending along the respective upper and lower ribs, and means securing said guide rods to said ribs to provide further stiffness and rigidity to said gantry.

11. A woodworking machine according to claim 9 wherein said longitudinally and laterally extending ribs are formed on the rear surface of said main beam, and wherein said gantry includes a housing comprising interconnected upper, lower and rear walls extending throughout substantially the length of said main beam, said rear wall being spaced from the rear surface of said main beam and said upper and lower walls being fixed to the corresponding upper and lower surfaces of said main beam, and lightweight plastic material filling the space rearwardly of said main beam and within said housing, said plastic material serving to add further rigidity to said gantry without substantially increasing the weight thereof.

12. A woodworking machine according to claim 10 wherein said drive means for moving said tool holder along said second machine ways from one side to the other of said gantry comprises a longitudinally extending drive screw extending between said upper and lower spaced apart guide rods, and a reversible motor drivingly connected to said drive screw for rotating said drive screw and correspondingly moving said tool holder along said gantry.

* * * * *